Oct. 13, 1964  J. L. COPPACK ETAL  3,152,392
METHOD OF ATTACHING FITTINGS TO RODS OR TUBES OF
RESIN-BONDED GLASS FIBER
Filed April 30, 1957  3 Sheets-Sheet 1

Inventor
John Lionel Coppack
William Gibson
By
Watt Mackey + Burden
Attorney

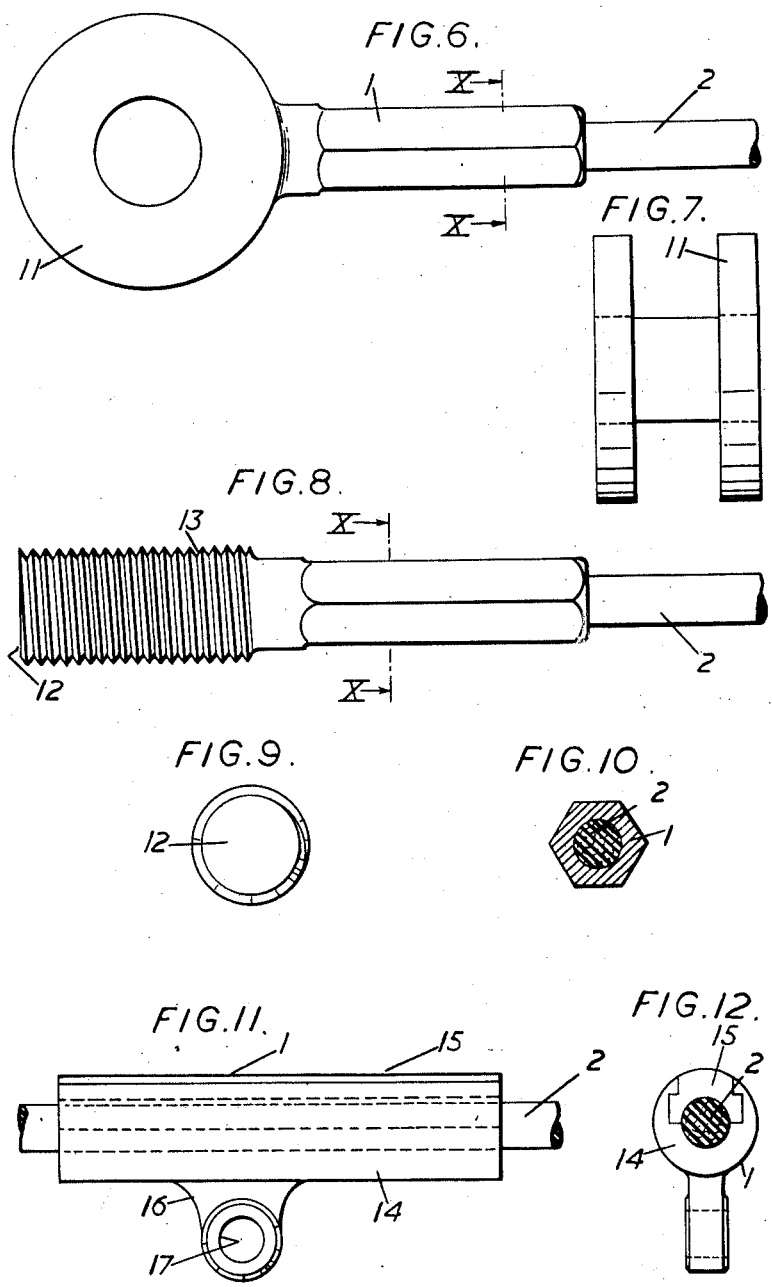

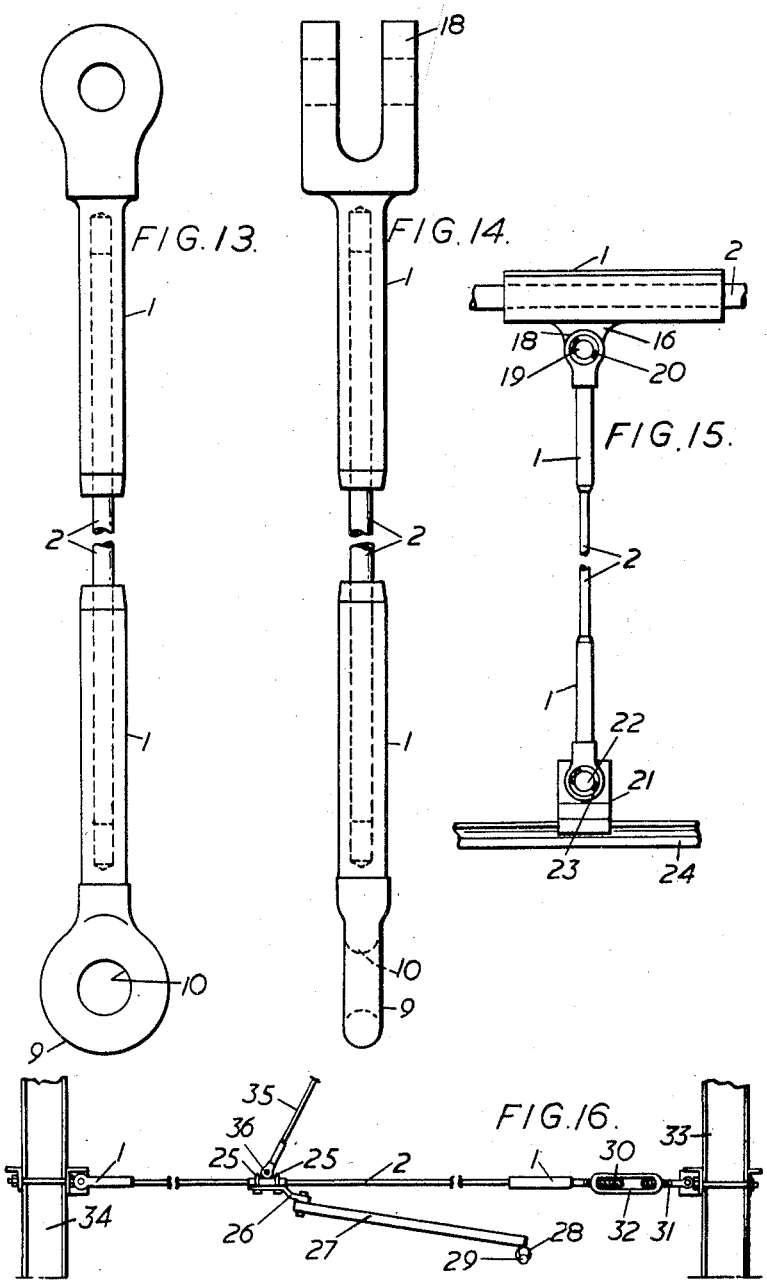

United States Patent Office 3,152,392
Patented Oct. 13, 1964

---

3,152,392
METHOD OF ATTACHING FITTINGS TO RODS OR TUBES OF RESIN-BONDED GLASS FIBER
John Lionel Coppack, Rainhill, and William Gibbon, Liverpool, England, assignors to British Insulated Callender's Cables Limited, London, England, a British company
Filed Apr. 30, 1957, Ser. No. 656,072
Claims priority, application Great Britain, May 7, 1956, 14,106/56
4 Claims. (Cl. 29—517)

This invention relates to rods and tubes of resin-bonded fibre, more especially to resin-bonded glass fibre rods and tubes, and to fittings for attachment to such rods and tubes.

For such rods and tubes metal fittings have been proposed which consist of or comprise a two-part clamp having grooved jaws which are caused to grip the surface of the rod or tube by one or more pairs of clamping bolts. Such fittings are reasonably satisfactory except where the fitting and the rod or tube to which it is clamped are under tension, as is the case where the fitting constitues a termination or a joint in a tensioned rod or tube. In such cases cone type fittings have been employed on resin-bonded glass fibre rods but these need to be of considerable length if they are to be capable of sustaining a tensile load equal to the full tensile strength of the rod. In some instances the length of the fitting approaches thirty times the diameter of the rod.

It is common practice to connect together the adjoining ends of two metallic members by means of a compressed metal sleeve but as far as we are aware it has not been thought to be applicable to the jointing of or terminating of rods and tubes of resin-bonded fibre. We have discovered, however, that it is possible by compressing a malleable metal sleeve upon a rod or tube of resin-bonded fibre so securely to attach it that the rod or tube will break under the load before it will pull out of the sleeve. This result is surprising for it would be expected that the effect of compressing a metallic sleeve on to a resin-bonded glass fibre rod or tube would be to crush the glass fibre/resin matrix and render it mechanically weak and it is unexpected having regard to the fact that resin-bonded glass fibre rods and tubes are weak in shear in the direction of their length. Fibres other than glass which can be used in the manufacture of the rod or tube are rayon, nylon and polyethylene terephthalate (terylene).

The present invention is based upon this discovery and resides in a method of attaching a fitting to a rod or tube of resin-bonded fibre which comprises placing a malleable metal sleeve, forming the fitting or a part thereof on the appropriate part to deform it to an extent to cause it to grip the rod or tube. The resin must be one that sets to a hard state either with or without heat. Examples of such resins are epoxide resins and polyester resins, but other resins can be used, for example, phenolic, silicone and melamine resins. We prefer to use rods consisting of a resin reinforced with glass filaments which lie substantially parallel to one another throughout the length of the rod, in such a way that the glass reinforcement is distributed throughout the cross-section of the rod. Substantially all of the reinforcing glass filaments are preferably of the same or approximately the same length as the rod.

The preferred content (by weight) of resin and glass is resin 30%–35% and glass 70–75%.

Fittings comprising sleeves that are initially of circular cross-section are preferred. These are preferably compressed to an external shape which is hexagonal or that of a hexagon whose corners are rounded. Sleeves of this cross-section are easier to manufacture and compressed to a hexagonal or approximately hexagonal form are believed to give the maximum tensile strength of anchorage. However, other cross-sectional shapes of sleeve may be used, for instance initially hexagonal or circular but with two or more flats, these being each compressed to an externally circular cross-section.

The invention will be described further with the aid of the accompanying drawings illustrating some applications of the invention to fittings suitable for use in overhead electric traction systems.

FIGURES 1–4 illustrate the application of the invention to the making of a mechanical joint between two rods, FIGURES 1 and 2 being longitudinal elevations in section and FIGURES 3 and 4, end sectional elevations taken on the lines III—III of FIGURE 1 and IV—IV of FIGURE 2, respectively. FIGURES 3 and 4 are drawn to a somewhat larger scale.

FIGURES 5–10 illustrate termination fittings used at an end of a rod, FIGURE 5 showing a longitudinal elevation, partly in section, of one form of fitting, FIGURE 6 showing a longitudinal elevation of another type of terminal fitting. FIGURE 7 is an end view of FIGURE 6 looking in the direction of the arrow, and FIGURE 8 is a longitudinal elevation of another form of termination fitting, FIGURE 9 being an end view of FIGURE 8 looking in the direction of the arrow. FIGURE 10 is an end sectional elevation taken through the line X—X of FIGURES 5, 6 and 8 in each case.

FIGURES 11 and 12 illustrate the apllication of a fitting to a rod between the ends of the rod, FIGURE 11 being a side elevation and FIGURE 12 an end elevation, partly in section.

FIGURES 13 and 14 are longitudintal views in elevation illustrating the use of fittings of different construction applied to the opposite ends of the same rod, the latter being shown broken away. FIGURE 14 is a view of FIGURE 13 turned through 90°.

FIGURE 15 is a side elevation illustrating a further application of the invention and FIGURE 16 is a similar view illustrating a still further application of the invention.

Figure 1:
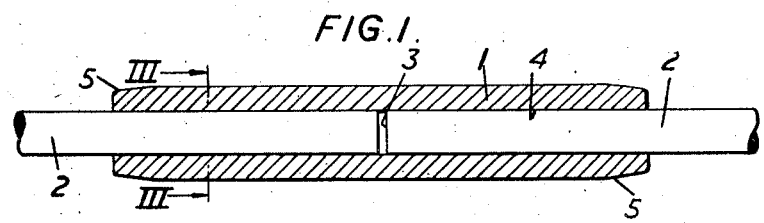

In FIGURES 1–4 the fitting consists of a metal sleeve 1 which is of malleable metal, for example, of copper or aluminium and is adapted to be compressed on to the coaxially disposed end portions of a pair of rods 2 made of resin-bonded glass fibre for the purpose of making a mechanical joint between the two rods. Before compression the sleeve 1 makes a sliding fit with the rods 2 and in FIGURE 1 the end portions of the rods 2 are shown inserted into the end of the sleeve 1, there being provided between the ends of the rods 2 a small gap 3. In FIGURE 1 it is assumed that the sleeve has been placed in position but that no actual joint has been made between the rods 2 by compression of the sleeve 1.

The sleeve has an exterior surface which is mainly cylindrical and a cylindrical bore 4. The wall of the sleeve 1 is of substantial thickness but for short distances extending inwards from the ends of the sleeve the wall thickness is slightly reduced by tapering the outer surface of the sleeve as indicated in FIGURE 1 at 5.

Figure 2:
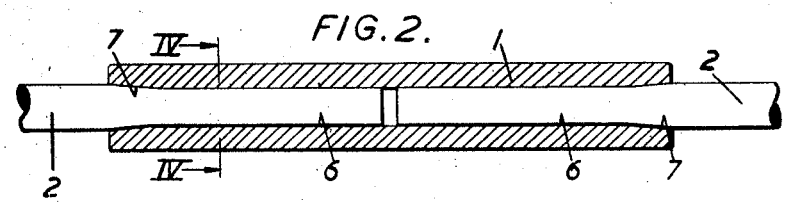
Figure 3:
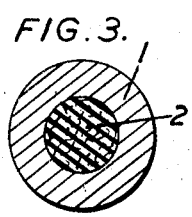
Figure 4:
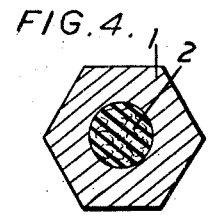

In FIGURE 2 there is indicated approximately the effect of applying a compressive force to the external surface of the sleeve 1 permanently to deform the sleeve and change its shape from the circular form in section to the hexagonal form, as seen in FIGURE 4. The compressive force is applied to the whole of the outer surface of the sleeve 1 with the exception of the tapering end portions 5, the result being to give to the outer surface of the sleeve a hexagonal form as shown in FIGURE 2 and to force the metal of the sleeve inwards to produce a wide annular recess for each of the end portions of the rods 2. The recesses are indicated by the reference numerals 6 in FIGURE 2. Each recess is slightly bell-mouthed at its outer end as the result of the compression and as indicated by the reference numerals 7 in FIGURE 2. As shown in FIGURES 2 and 4 the portions of the rods within the sleeves substantially retain the plain cylindrical surface which they had before the sleeves were compressed onto them.

In FIGURES 5–9 there are shown different constructions of metal fitting attached to an end of a rod 2 of resin-bonded glass fibre. In each case the fitting comprises a sleeve 1 of malleable metal. The sleeve is an integral part of the fitting and provides a socket open at one end for the reception of the rod 2. In each case the fitting is attached to the end of the rod by inserting the end of the rod into the sleeve and compressing the latter to bring it to a hexagonal shape in cross-section and to cause it to grip the end portion of the rod 2. The sleeve 1 makes a sliding fit on the end of the rod and before compression is of circular cross-section. The effect of compressing the sleeve is to form an annular recess in the sleeve having a slightly bell-mouthed end as indicated at 8 in FIGURE 5.

Figure 5:
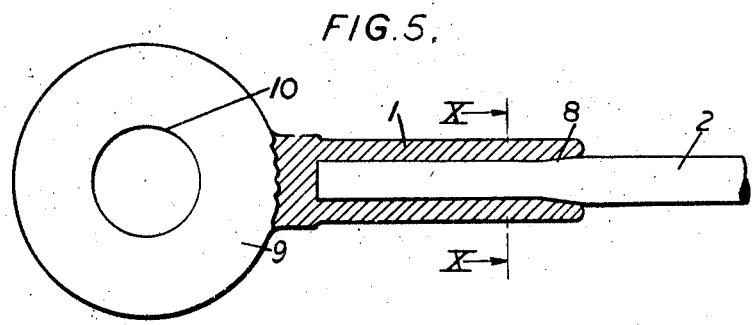

In the construction shown in FIGURE 5, the fitting comprises a cylindrical lug 9 provided with a central circular aperture 10 extending through it. Such fittings when attached to the ends of a resin-bonded glass fibre rod could form a neutral section or serve as an insulator in a catenary used in an overhead electric traction system.

In the construction shown in FIGURES 6 and 7, the fitting has a clevis end 11 in place of the lug 9 of FIGURE 5. This fitting and its attached rod may be used as part of a stay rod for an overhead transmission line.

In the construction shown in FIGURES 8 and 9, the fitting has an end 12 which has a screw-threaded outer surface as indicated at 13 in order that the fitting may be screwed into an anchoring member or other fitting of any convenient kind. The fitting attached to its rod shown in FIGURES 8 and 9 may be used as part of a section insulator in overhead railway electrification.

FIGURE 10 illustrates in each case in cross-section the final hexagonal form of the sleeve 1 shown in FIGURES 5, 6 and 8 after attachment of the fitting to the rod 2.

In FIGURES 11 and 12, there is shown a fitting placed on a rod 2 of resin-bonded glass fibre which projects through the fitting on each side thereof. The fitting comprises a sleeve 1 of malleable metal consisting of two parts 14 and 15 which co-operate in such a manner that when fitted together by a relative axial sliding movement, to form an enclosure for a portion of the length of the rod 2, the two parts cannot be moved apart in a direction at right angles to the longitudinal axis of the rod. As will be seen from FIGURE 12 the two parts are provided with co-operating recesses and projections which whilst permitting relative longitudinal sliding movement, prevent separation of the two parts, when engaged, in a direction at right angles to the axis of the rod 2. The part 14 of the fitting is provided with an external lug 16 having an aperture 17. Before compression the sleeve has a periphery of circular cross-section, as shown in FIGURE 12. To attach the fitting to the rod 2 compression is applied to the sleeve 1 on each side of the lug 16. The compression may be to give the compressed portions a hexagonal shape or a circular shape with oppositely disposed flats, according to the shape of the jaws of the compression tool used. The result of the compression is to bring the parts 14 and 15 into intimate contact with the rod 2 and thereby attach the fitting firmly to the rod.

In FIGURES 13 and 14 there are shown two metal fittings attached to opposite ends of a rod 2 of resin-bonded glass fibre. Each fitting comprises a malleable metal sleeve 1 and one fitting has a forked end 18 and the other fitting has a lug 9 with an aperture 10 through it, similar to that shown in FIGURE 5. The two fittings are attached to the opposite ends of the rod 2 by compressing the sleeves 1 to effect their permanent deformation and to cause them to grip the rod. The arrangement shown in FIGURES 13 and 14 may be used in overhead railway electrification where, for example, the lug 9 is to provide means for anchoring the rod 2 at one end and the other end is to be attached to some other fitting. The arrangement shown in FIGURES 13 and 14 may be used as stay rods for overhead transmission poles or as tensioned support members for overhead electric traction systems.

In FIGURE 15 there is shown an arrangement which may be used for supporting an overhead contact wire 24, forming part of a trolleybus system. The fitting shown in FIGURES 11 and 12 is attached to a continuous catenary rod 2 of resin-bonded glass fibre. To the lug 16 is attached a fitting having a forked end 18 of the kind shown in FIGURES 13 and 14, the attachment being made with the aid of a pivot pin 19 and a split pin 20. The attachment of the fitting with the forked end 18 to the upper end of the rod 2 is effected by compression. The contact wire 24 is provided with a claw clip 21 which is attached to a fitting also having a forked end with the aid of a pivot pin 22 and split pin 23. This latter fitting is attached to the lower end of the rod 2 by compression.

In FIGURE 16 there is shown the application of the invention to a cross-span suspension arrangement for an overhead railway electrification system. The arrangement comprises a rod 2 of resin-bonded glass fibre to one end of which is attached a fitting having a malleable sleeve 1. This fitting is similar to that shown in FIGURE 5. A second fitting similar to that shown in FIGURES 11 and 12 is attached by compression on to the rod 2 between the ends of the rod. To this second fitting is attached by hook bolts 25 a bracket 26 attached to one end of a bar 27 carrying a claw clip 28 for an overhead conductor 29. To the opposite end of the rod 2 is attached a third fitting comprising a malleable sleeve 1 and a screwed rod 30 connected to a second screwed rod 31 by a turn buckle 32. The rod 31 is anchored to a vertical support 33 and the fitting at the opposite end of the rod 2 is anchored to a vertical support 34. The rod is supported from above by a catenary (not shown) with the aid of a malleable sleeve fitting 36 attached to the fitting carrying the bracket 26 and an upwardly extending rod 35 of resin-bonded glass fibre.

In FIGURE 15, the rod 2 shown at the upper part of that figure forms a catenary and is a tensioned support member. Similarly in FIGURE 16 the rod 2 forms a tensioned support member. In FIGURE 15 the sleeve 1 attached to the catenary rod 2 has a lug 16 projecting from it. In those cases where the tensioned support member is of considerable length the lug 16 projecting from the sleeve may lie at such an angle to the axis of the sleeve that it assumes an approximately vertical position when the sleeve lies away from the central part of the catenary curve assumed by the rod of resin-bonded fibre.

The invention is of particular advantage in overhead electric traction systems where the rods of resin-bonded fibre and the fittings are under tension tending to pull the rods out of the fittings since it has been found that fittings consisting of or comprising malleable metal sleeves can be attached to such rods by compression of the sleeves in such a manner that the fittings can be caused to grip the rods so firmly that the strength of the joints between the fittings and the rods approaches the full tensile strength of the rods and in certain instances the full tensile strength of the rods can be developed without the latter pulling out of the fittings, although the malleable sleeves may be of comparatively short length as compared with the diameter of the rod.

As an indication of the unexpected efficiency of the novel method of attaching fittings to resin-bonded fibre rods, it is mentioned that on a ¼ inch diameter rod of resin-bonded glass fibre, a compression sleeve having an effective length of 1½ inches, that is six times the diameter of the rod, was found to have an ultimate tensile strength of attachment of 141,000 pounds per square inch of glass fibre rod.

Where the fitting is to be attached to a tube, the tube must of course have a thickness of wall sufficient to withstand the compressive force required for the attachment of the fitting to the tube. In the claims, by the term "rod" or "rods," I mean solid rods and solid-walled tubes.

As by the use of our improved method of attaching fittings the full tensile strength of the rod or tube is developed, it becomes practicable to build up engineering structures involving stressed tension and compression members from resin-bonded fibre rods or tubes furnished with fittings in accordance with the invention.

What we claim as our invention is:

1. A method of making a tension-resistant connection between a metal fitting and a rod of resin-bonded glass fibre comprising placing a sleeve of malleable metal, forming at least part of the fitting and having a length that is short as compared with that of the rod, on an end part of the rod which, over the entire length surrounded by the sleeve, has a plain cylindrical surface and compressing the sleeve on to the said end part of the rod so that the rod substantially retains its plain cylindrical surface and to an extent to cause it to grip the rod frictionally with sufficient force to form a joint between the rod and the metal fitting which joint has a strength approaching the full tensile strength of the rod.

2. A method of making a tension-resistant connection between a metal fitting and a rod of resin-bonded glass fibre comprising placing a sleeve of malleable metal, forming at least part of the fitting and having a length that is short as compared with that of the rod on a part of the rod, which, over the entire length surrounded by the sleeve, has a plain cylindrical surface, at least one end of the sleeve having emerging therefrom a portion of the rod which is subject to tension and having a wall thickness which is reduced relative to the wall thickness of the balance of the sleeve, and compressing the sleeve on said rod so that the rod substantially retains its plain cylindrical surface except the portion within the end of the sleeve having a reduced wall thickness, the sleeve being compressed to an extent to cause it to grip the rod frictionally with sufficient force to form a joint between the rod and the metal fitting, which joint has a strength approaching the full tensile strength of the rod.

3. A method of making a tension-resistant connection between a metal fitting and a rod of resin-bonded glass fibre comprising placing a sleeve of malleable metal, forming at least part of the fitting and having a length that is short as compared with that of the rod, on an end part of the rod which, over the entire length surrounded by the sleeve, has a plain cylindrical surface, the end of the sleeve that is the more remote from the neighboring end of the rod being of reduced wall thickness, and compressing the sleeve on to the said end part of the rod so that the rod substantially retains its plain cylindrical surface except the portion within the end of the sleeve having a reduced wall thickness, the sleeve being compressed to an extent to cause it to grip the rod frictionally with sufficient force to form a joint between the rod and the metal fitting, which joint has a strength approaching the full tensile strength of the rod.

4. A method of making a tension-resistant connection between a metal fitting and a rod of resin-bonded glass fibre comprising placing a thick-walled sleeve of malleable metal forming at least part of the fitting and having a length that is short as compared with that of the rod on a part of the rod which over the entire length of the part surrounded by the sleeve is of circular shape in cross-section and has a plain cylindrical surface and compressing the sleeve on to the rod so that the rod substantially retains its plain cylindrical surface and to an extent to cause it to grip the rod frictionally with sufficient force to form a joint between the rod and the metal fitting, which joint has a strength approaching the full tensile strength of the rod.

References Cited in the file of this patent

UNITED STATES PATENTS

| | | |
|---|---|---|
| 424,575 | Reed | Apr. 1, 1890 |
| 516,808 | Henry | Mar. 20, 1894 |
| 1,006,040 | Alsberg | Oct. 17, 1911 |
| 1,006,041 | Alsberg | Oct. 17, 1911 |
| 1,272,700 | Newcomb | July 16, 1918 |
| 1,793,293 | Varney et al. | Feb. 17, 1931 |
| 1,863,048 | Hayford | June 14, 1932 |
| 1,909,344 | Green et al. | May 16, 1933 |
| 2,109,837 | Davis | Mar. 1, 1938 |
| 2,186,441 | Youmans | Jan. 9, 1940 |
| 2,193,450 | Dixon et al. | Mar. 12, 1940 |
| 2,195,732 | Matthes | Apr. 2, 1940 |
| 2,198,149 | Bangert | Apr. 23, 1940 |
| 2,334,710 | Kauth | Nov. 23, 1943 |
| 2,341,235 | Palmer | Feb. 8, 1944 |
| 2,388,860 | Matthes | Nov. 13, 1945 |
| 2,411,079 | Baule | Nov. 12, 1946 |
| 2,428,899 | Wiegand | Oct. 14, 1947 |
| 2,441,309 | Cook | May 11, 1948 |
| 2,597,444 | Brown et al. | May 20, 1952 |
| 2,614,058 | Francis | Oct. 14, 1952 |
| 2,877,539 | Kinnan | Mar. 17, 1959 |